(12) United States Patent
Peng et al.

(10) Patent No.: US 8,009,949 B1
(45) Date of Patent: Aug. 30, 2011

(54) FIBER BUNDLE HEAD UP DISPLAY

(75) Inventors: Guolin Peng, Cedar Rapids, IA (US); Mark J. Nimmer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/492,430

(22) Filed: Jul. 25, 2006

(51) Int. Cl.
  G02B 6/06 (2006.01)
  G02B 6/04 (2006.01)

(52) U.S. Cl. ............ 385/115; 385/116; 385/119

(58) Field of Classification Search ............ None
  See application file for complete search history.

(56) References Cited

U.S. PATENT DOCUMENTS

| | | | | |
|---|---|---|---|---|
| 4,170,400 A | * | 10/1979 | Bach et al. | 385/119 |
| 4,735,473 A | * | 4/1988 | Migozzi et al. | 359/15 |
| 5,293,271 A | * | 3/1994 | Merritt et al. | 359/858 |
| 5,511,141 A | * | 4/1996 | Peli | 385/116 |
| 5,815,624 A | * | 9/1998 | Rosenberg | 385/115 |
| 5,991,087 A | * | 11/1999 | Rallison | 359/631 |
| 2007/0002238 A1 | * | 1/2007 | Jang et al. | 349/134 |

* cited by examiner

*Primary Examiner* — Omar Rojas
(74) *Attorney, Agent, or Firm* — Daniel M. Barbieri

(57) ABSTRACT

A fiber bundle head up display includes a bundle of optical fibers. An image source projects a display image onto the fiber bundle. The fiber bundle transfers the display image from its input surface to its output surface and projects the display image onto a combiner, which superimposes the display image in the visual field of a viewer. The fiber bundle transforms the display image while performing three-dimensional relocation of picture elements of the display image to reduce aberration and distortion of the display image. The fiber bundle may be utilized for pre-transforming the display image to reduce or eliminate a variety of image aberration types.

15 Claims, 6 Drawing Sheets

US 8,009,949 B1

FIBER BUNDLE HEAD UP DISPLAY

FIELD OF THE INVENTION

The present invention generally relates to the field of head up displays, and more particularly to a head up display including a fiber bundle for projecting a display image.

BACKGROUND OF THE INVENTION

The technique of providing pilots with a Head Up Display (HUD) was developed for military fighter aircraft. A typical head up display includes electronically generated flight, navigational, attack, or other data superimposed upon a pilot's visual field. A computer receives and processes aircraft equipment and sensor data, and utilizes this data to generate symbology for the head up display. The symbology is collimated into a display image and projected onto a display combiner so that the symbology overlays the pilot's view of the real world.

Existing head up displays utilize reflective and refractive technologies, as well as wider field-of-view holographic head up displays. However, these techniques are complicated by the geometry of the optical path from the projector to the combiner, which often causes aberration and distortion of the display image, including keystone aberration, curvature aberration, and astigmatism. Typically, a complicated system of lenses is required to mitigate the aberration and distortion of the display image, increasing the complexity and cost of prior art head up displays.

Thus, it would be desirable to provide a head up display including hardware for reducing aberration and distortion of a display image projected onto a combiner. Moreover, it would be desirable to mitigate the aberration and distortion without a complex system of lenses.

SUMMARY OF THE INVENTION

Accordingly, the present invention is directed to a head up display (HUD) including a fiber bundle (e.g., a bundle of optical fibers) for projecting a display image. The head up display includes an image source for projecting the display image onto the fiber bundle. The fiber bundle has an input surface for receiving the display image and an output surface for projecting the display image. The fiber bundle transfers the display image from the input surface to the output surface and projects the display image onto a combiner, superimposing the display image in the viewer's visual field.

In one aspect of the invention, the fiber bundle transforms the display image, e.g., the fiber bundle projects the display image onto the surface of the combiner while performing three-dimensional (3D) relocation of a picture element (pixel) included with the display image. The display image is transformed by relocating the picture elements comprising the display image from the image source to the combiner. In embodiments, the display image is curved, tiled, magnified, or transformed in other ways as desired. Thus, the fiber bundle may be utilized to transform the display image to reduce aberration and distortion of the display image.

In another aspect of the invention, the fiber bundle pre-transforms the display image in 3D space, simplifying image aberration that may be corrected by additional lenses of the head up display. For example, if the head up display has keystone aberration, the fiber bundle pre-keystones the display image; if the head up display has field curvature aberration, the fiber bundle pre-curves the display image to cancel the aberration; if the head up display has astigmatism, the fiber bundle shifts a flat display image to a cylinder image. Thus, the fiber bundle may pre-transform the display image to reduce or eliminate a variety of image aberration types.

The head up display may include a microlens array for receiving the display image and focusing the display image onto the fiber bundle. The head up display may also include a compensation film positioned between the image source and the fiber bundle. The compensation film may be utilized for widening the viewing angle of a picture element of the display image by a corresponding optical fiber of the fiber bundle.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
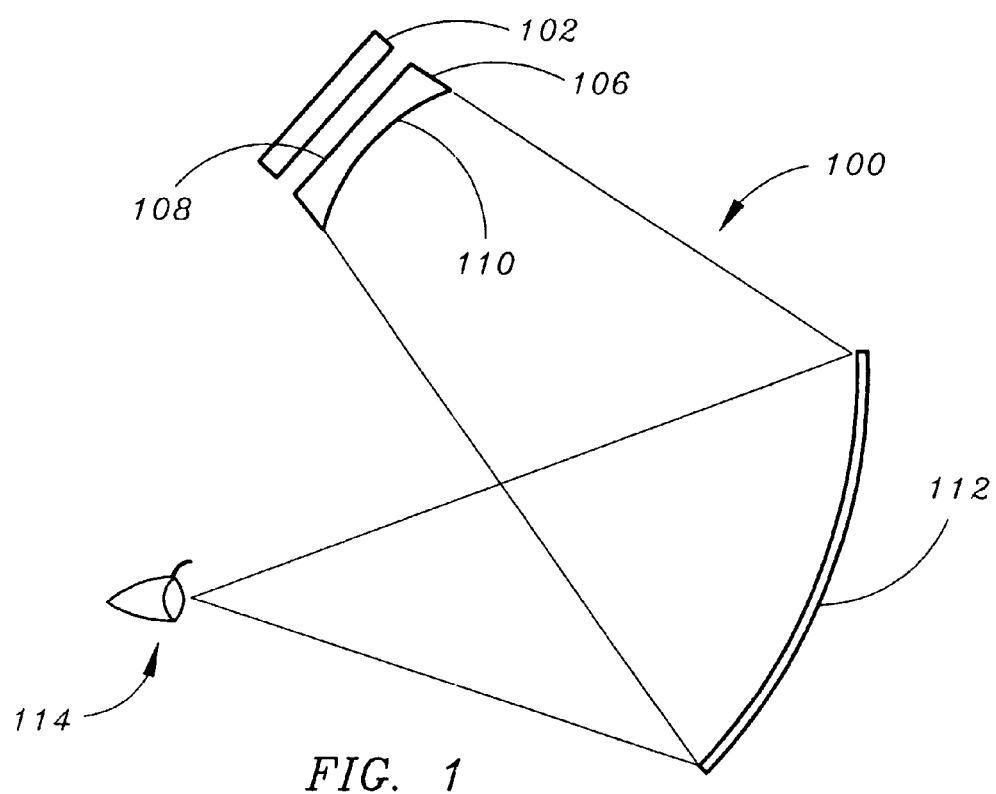
FIG. 1 is a side elevation view illustrating a head up display in accordance with an exemplary embodiment of the present invention, wherein a fiber bundle having a concave output surface is utilized for projecting a display image onto a combiner.
Figure 2:
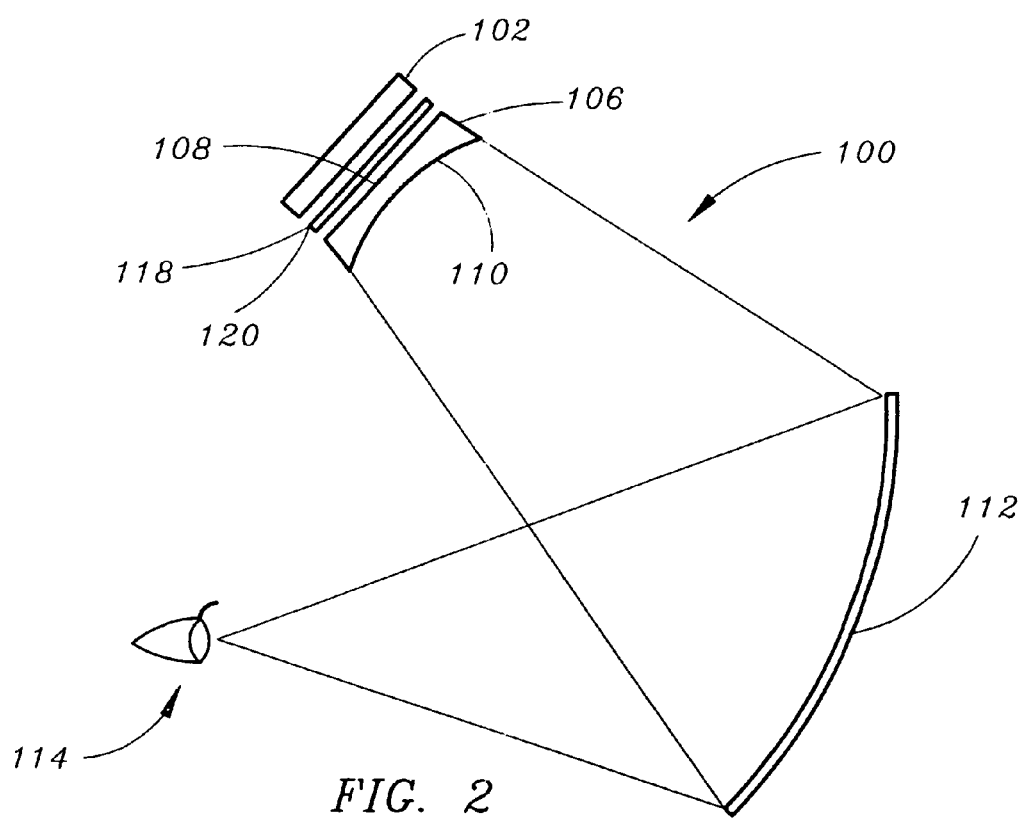
FIG. 2 is a side elevation view illustrating a head up display in accordance with an exemplary embodiment of the present invention, wherein a fiber bundle having a concave output surface is utilized for projecting a display image onto a combiner, and the head up display includes a microlens array and compensation film.
Figure 3:
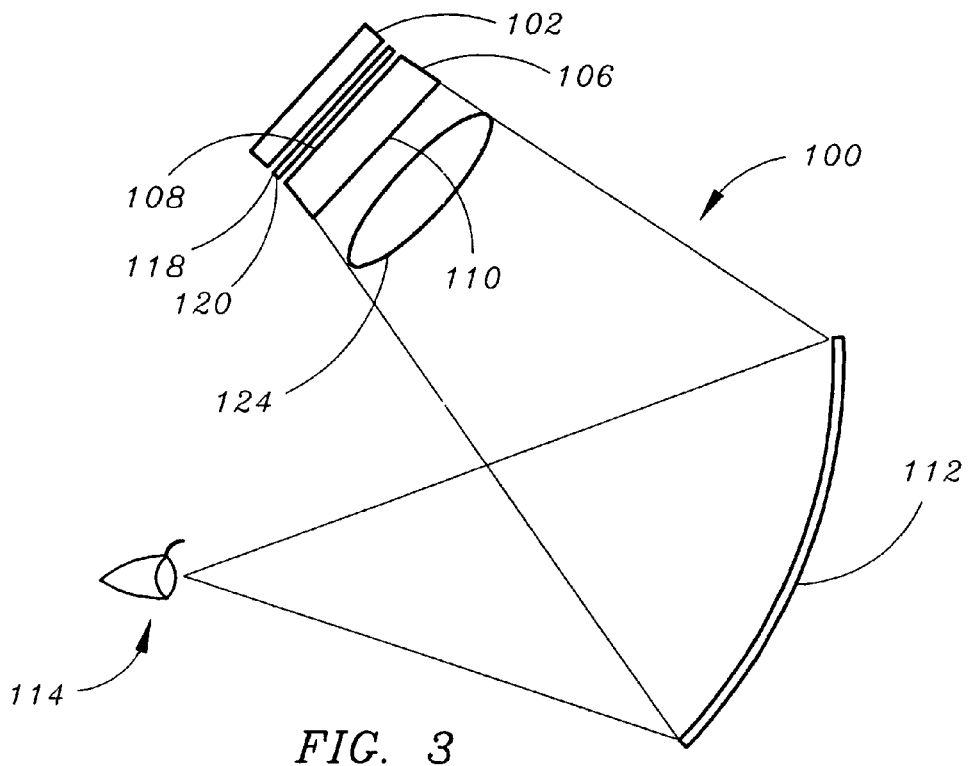
FIG. 3 is a side elevation view illustrating a head up display in accordance with an exemplary embodiment of the present invention, wherein a fiber bundle is utilized for projecting a display image onto a combiner, and the head up display includes a microlens array and compensation film, as well as optical lenses.
Figure 4:
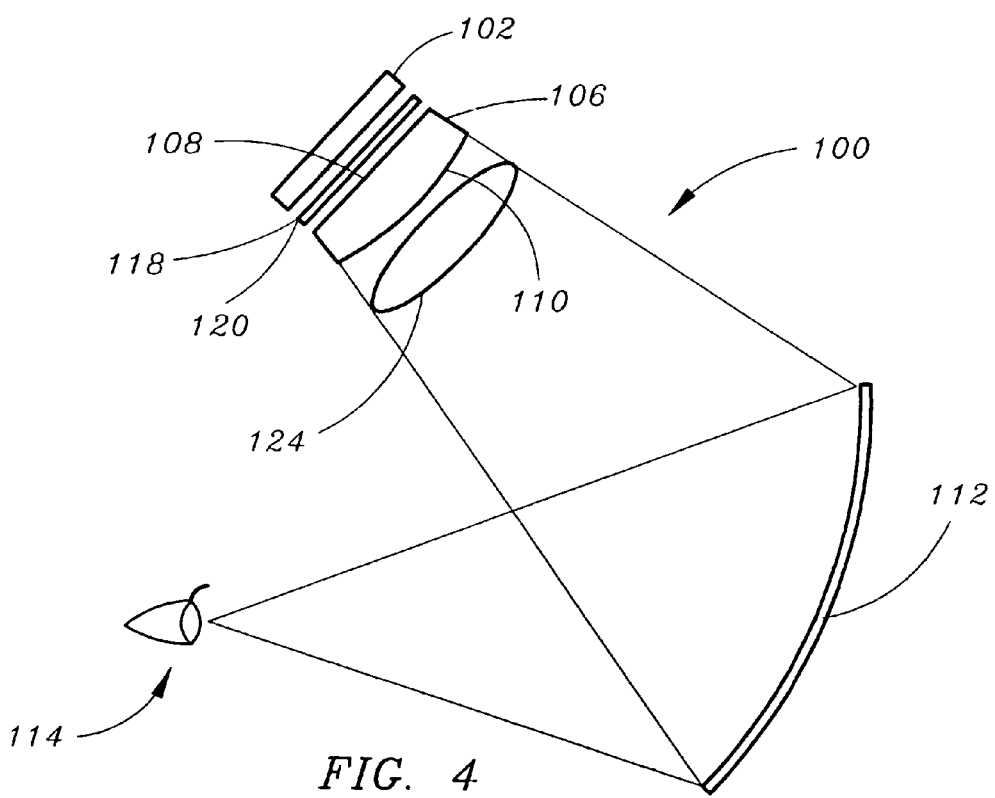
FIG. 4 is a side elevation view illustrating a head up display in accordance with an exemplary embodiment of the present invention, wherein a fiber bundle having a convex output surface is utilized for projecting a display image onto a combiner, and the head up display includes a microlens array and compensation film, as well as optical lenses.

Reference will now be made in detail to the presently preferred embodiments of the invention, examples of which are illustrated in the accompanying drawings.

Referring generally to FIGS. 1 through 6, a head up display (HUD) 100 is described in accordance with exemplary embodiments of the present invention. The head up display 100 includes an image source 102 for projecting a display image 104, such as a display image including symbology representing aircraft equipment and sensor data, or the like. The image source 102 may include a Liquid Crystal Display (LCD), an Organic Light Emitting Diode (OLED), a Light Emitting Diode (LED), or another type of projector. The image source 102 is positioned for projecting the display image 104 onto a fiber bundle (e.g., a bundle of optical fibers) 106. The fiber bundle 106 includes an input surface 108 for receiving the display image 104 and an output surface 110 for projecting the display image. The fiber bundle 106 transfers the display image 104 from the input surface 108 to the output surface 110 and projects the display image onto a combiner 112. The combiner 112 may include a half-silvered mirror that both reflects light and transmits light, or another type of partially reflective beam splitter. The combiner 112 is positioned in the visual field of a viewer 114, and superimposes the display image 104 received from the fiber bundle 106 in the viewer's visual field.

In embodiments, the fiber bundle 106 transforms the display image 104 projected onto the combiner 112. For example, the fiber bundle 106 transfers the display image 104 from the input surface 108 to the surface of the combiner 112 while performing three-dimensional (3D) relocation of a picture element (pixel) 116 included with the display image 104. Thus, the display image 104 is transformed by relocating the picture elements 116 comprising the display image from the image source 102 to the combiner 112. The display image 104 may be curved, tiled, magnified, or transformed in other ways as desired. Such transformation may be desirable for providing modulation of the display image 104 appropriate for the geometry of the combiner 112, as well as for the viewer 114. For instance, the fiber bundle 106 may be utilized to transform the display image 104 to reduce aberration and distortion of the display image, which may otherwise be present if the display image 104 were projected directly from the image source 102 onto the combiner 112. The fiber bundle 106 may be arranged along a non-linear path, such as a curved path, or another non-linear path, between the image source 102 and the combiner 112. For example, in a specific embodiment, the fiber bundle 106 includes fine glass fibers, fine plastic fibers, or other flexible materials. The fiber bundle 106 bends the display image 104 from the input surface 108 to the output surface 110 and then projects the display image onto the combiner 112. In this manner, the fiber bundle 106 bends the display image 104 from the image source 102 to the combiner 112.

It is contemplated that the fiber bundle 106 may be utilized for pre-transforming (including the distortion) the display image 104 in 3D space, simplifying image aberration that may be corrected by optical lenses 124 of the head up display 100. For example, in one specific embodiment, in which the head up display 100 has keystone aberration, the fiber bundle 106 pre-keystones the display image 104. In another specific embodiment, in which the head up display 100 has field curvature aberration, the fiber bundle 106 pre-curves the display image 104 to cancel the aberration. In a further embodiment, in which the head up display 100 has astigmatism, the fiber bundle 106 shifts a flat display image 104 to a cylinder image. It will be appreciated that the fiber bundle 106 may pre-transform the display image 104 to reduce or eliminate a variety of image aberration types without departing from the scope and spirit of the present invention. Further, the fiber bundle 106 may be utilized with a variety of head up displays 100 having one or more additional optical lenses 124.

In exemplary embodiments, the head up display 100 may include a microlens array 118 for receiving the display image 104 and focusing the display image 104 onto the fiber bundle 106. For example, in a specific embodiment, the microlens array 118 includes a microlens positioned for receiving the picture element 116 of the display image 104 from the image source 102 and focusing the picture element 116 onto a corresponding optical fiber of the fiber bundle 106. It is contemplated that, in this manner, one or more picture elements 116 may be associated with each optical fiber of the fiber bundle 106. It is contemplated that the head up display 100 may also include a compensation film 120 positioned between the image source 102 and the fiber bundle 106. The compensation film 120 may be utilized for widening the viewing angle of the picture element 116 by a corresponding optical fiber of the fiber bundle 106. It will be appreciated that various lenses and compensation films may be utilized without departing from the scope and intent of the present invention.

Figure 5:
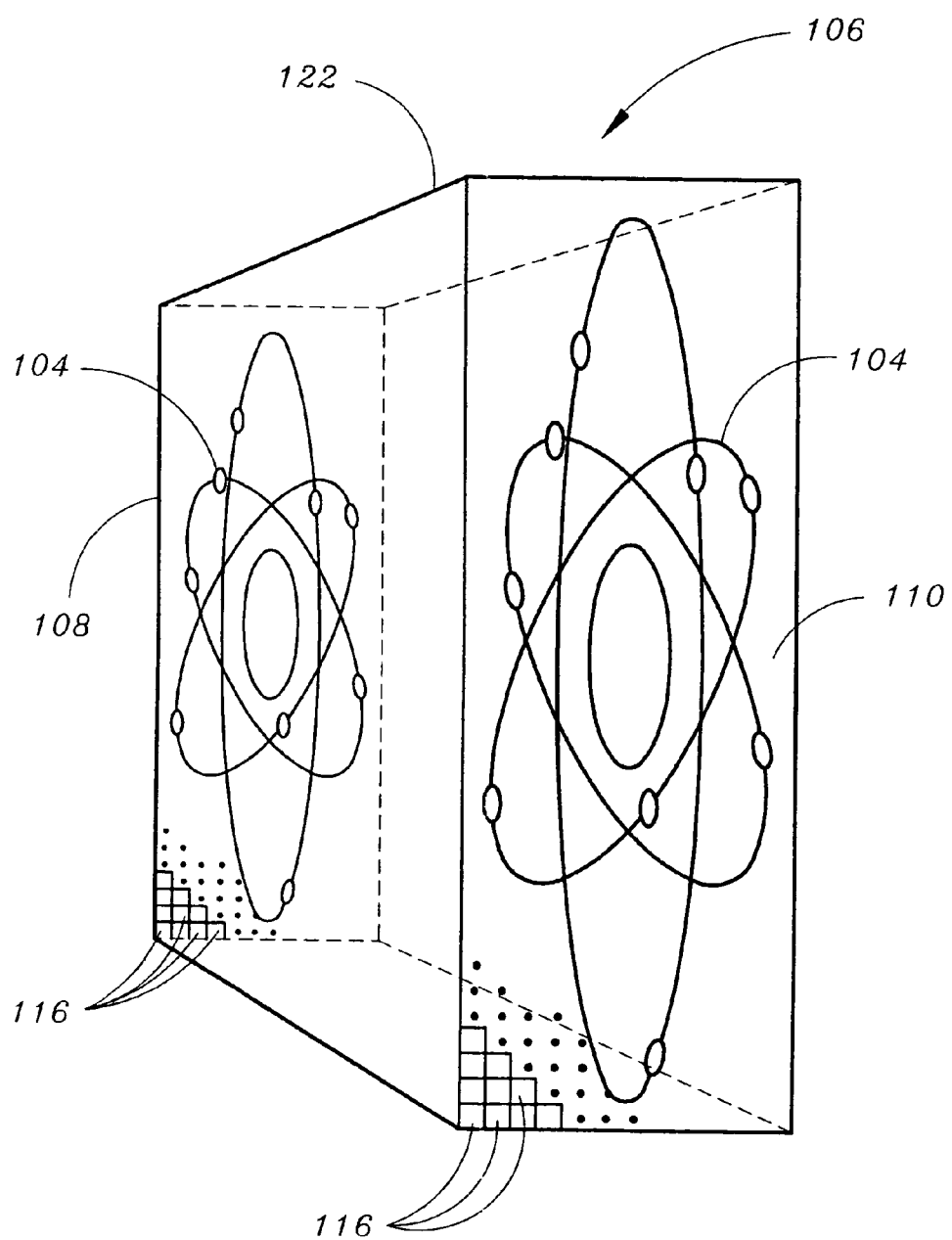
FIG. 5 is a perspective view illustrating a fiber optic taper for use with a head up display in accordance with an exemplary embodiment of the present invention.
Figure 7:
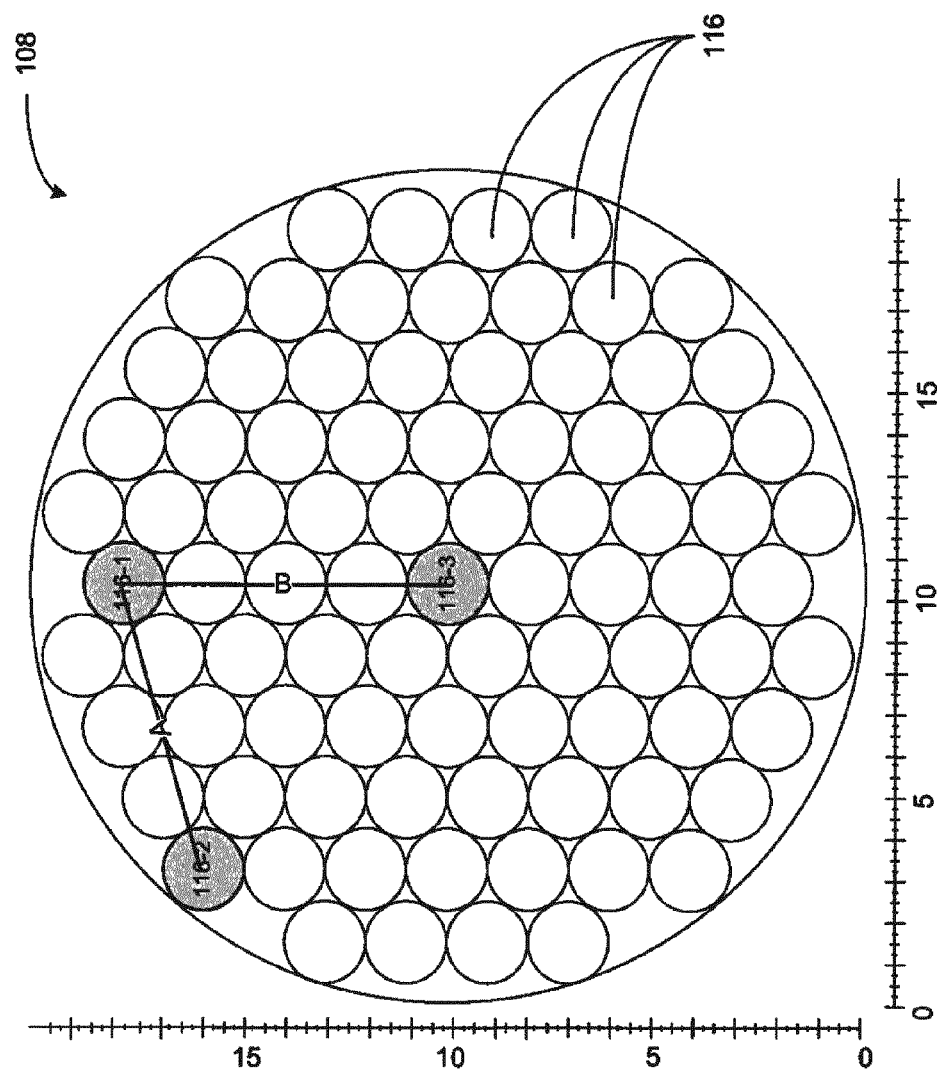
FIG. 7 shows a cross section of an input surface of a fiber bundle with a substantially round geometry.
Figure 8:
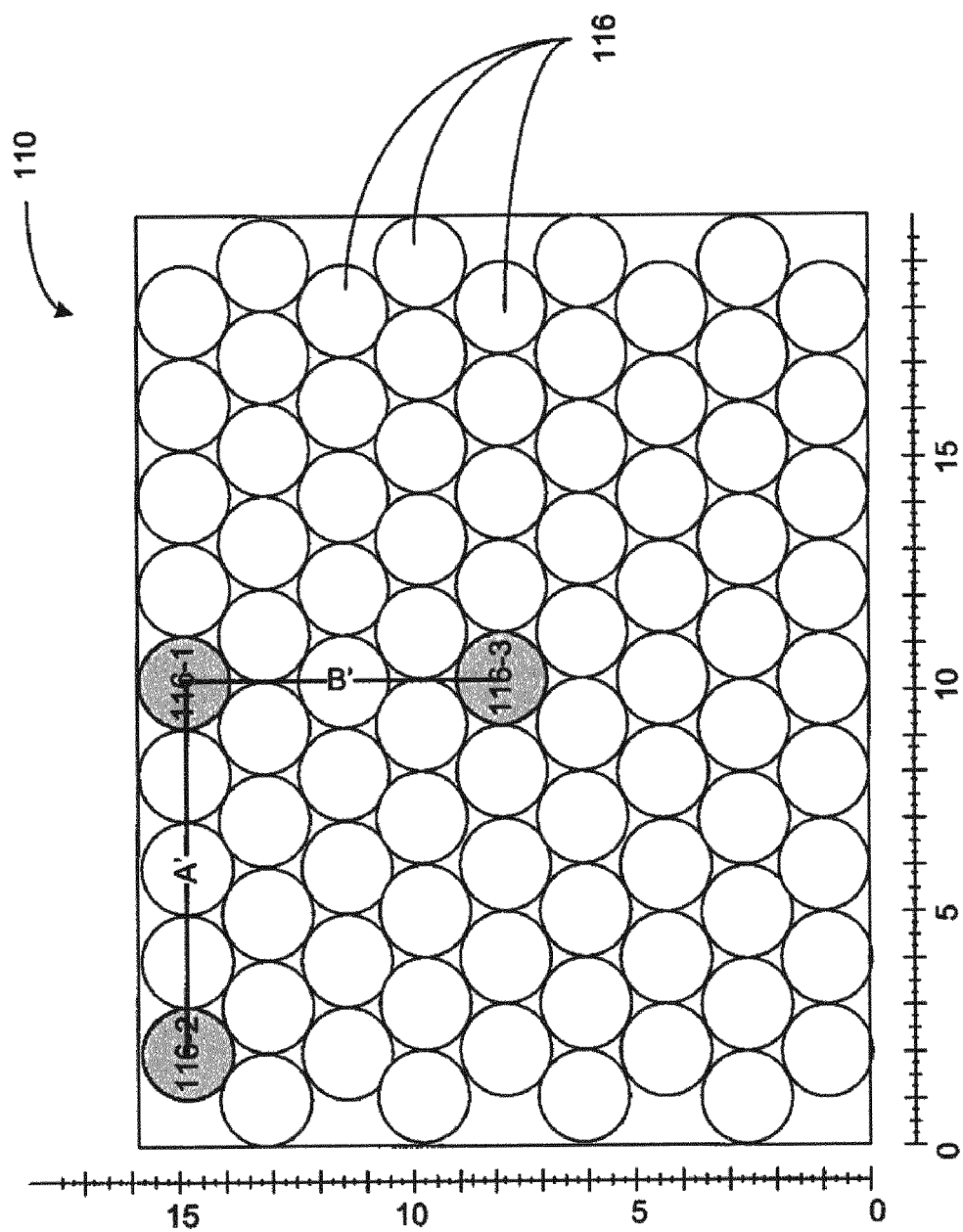
FIG. 8 shows a cross section of an input surface of a fiber bundle with a substantially rectangular geometry.

In one specific embodiment, illustrated in FIG. 5, the fiber bundle 106 includes a fiber optic taper 122. For example, the fiber optic taper 122 may include a bundle of optical fibers packed together and, with the application of heat and stress, drawn into a myriad of arrays for high quality light and image transmission. The fiber optic taper 122 can be machined into configurations from round to round, square to square, round to square, and rectangular, as well as other configurations. For example, FIG. 7 shows an exemplary input surface 108 of a fiber bundle 106 having a substantially round geometry. Further, FIG. 8 shows an exemplary output surface 110 of the fiber bundle 106 having a substantially rectangular geometry. As shown in FIGS. 7 and 8, in order to translate the fibers of the fiber bundle 106 between the substantially round geometry at the input surface 108 to the substantially rectangular geometry at the output surface 110, one or more fibers 116 must be relocated with respect to other fibers 116 in a manner that inherently results in a changes in a relative positions between the fibers that are non-proportional. For example, as shown in FIG. 7, the fiber bundle 106 may include fibers 116-1, 116-2 and 116-3. The fiber 116-1 may be spatially separated from the fiber 116-2 and the fiber 116-3 by distances A and B, respectively, in the plane of the input surface 108. As shown in FIG. 8, the fibers 116 may be realigned as they move from the input surface 108 of the fiber bundle 106 to the output surface 110 such that the output surface 110 has the resulting substantially rectangular geometry. Between the input surface 108 and the output surface 110, the spatial separation between fibers 116-1, 116-2 and 116-3 may change such that the fiber 116-1 may be spatially separated from the fiber 116-2 and the fiber 116-3 by distances A' and B', respectively, in the plane of the output surface 108. As can be seen from FIGS. 7 and 8, in order to translate fiber bundle from the substantially round geometry at the input surface 108 to the substantially rectangular geometry at the output surface 110, the change in relative position of the fiber 116-1 and fiber 116-2 between the input surface 108 and the output surface 110 is non-proportional with respect to a change in relative position of the fiber 116-1 and fiber 116-3 between the input surface 108 and the output surface 110 (e.g. $\Delta A$ is positive and $\Delta B$ is negative). The fiber optic taper 122 may provide a substantially distortion-free method for providing modulation of the display image 104 appropriate for the geometry of the combiner 112, as well as for the viewer 114 (e.g., magnifying the display image 104 for the combiner 112). Further, because of the inherent mixing capability of the fiber optic taper 122, its utilization with a head up display 100 may be advantageous for smoothing spatial non-uniformities, making alignment of the display image 104 onto the combiner 112 much easier.

In one specific embodiment, the head up display 100 is utilized for superimposing electronically generated flight, navigational, attack, or other data in a fighter aircraft pilot's visual field. In other embodiments, the head up display 100 is utilized with other vehicles, including commercial aircraft, motor vehicles, and the like. In these embodiments, the visual field may be defined relative to the vehicle, such as being defined for a forward-facing viewer seated in the cockpit of an aircraft, the driver's seat of a motor vehicle, or the like. A computer determines an image to be presented depending on the orientation of the vehicle and utilizes this data to generate symbology for the head up display 100. The symbology is collimated into the display image 104 that is projected by the image source 102 onto the fiber bundle 106 and then onto the combiner 112.

Figure 6:
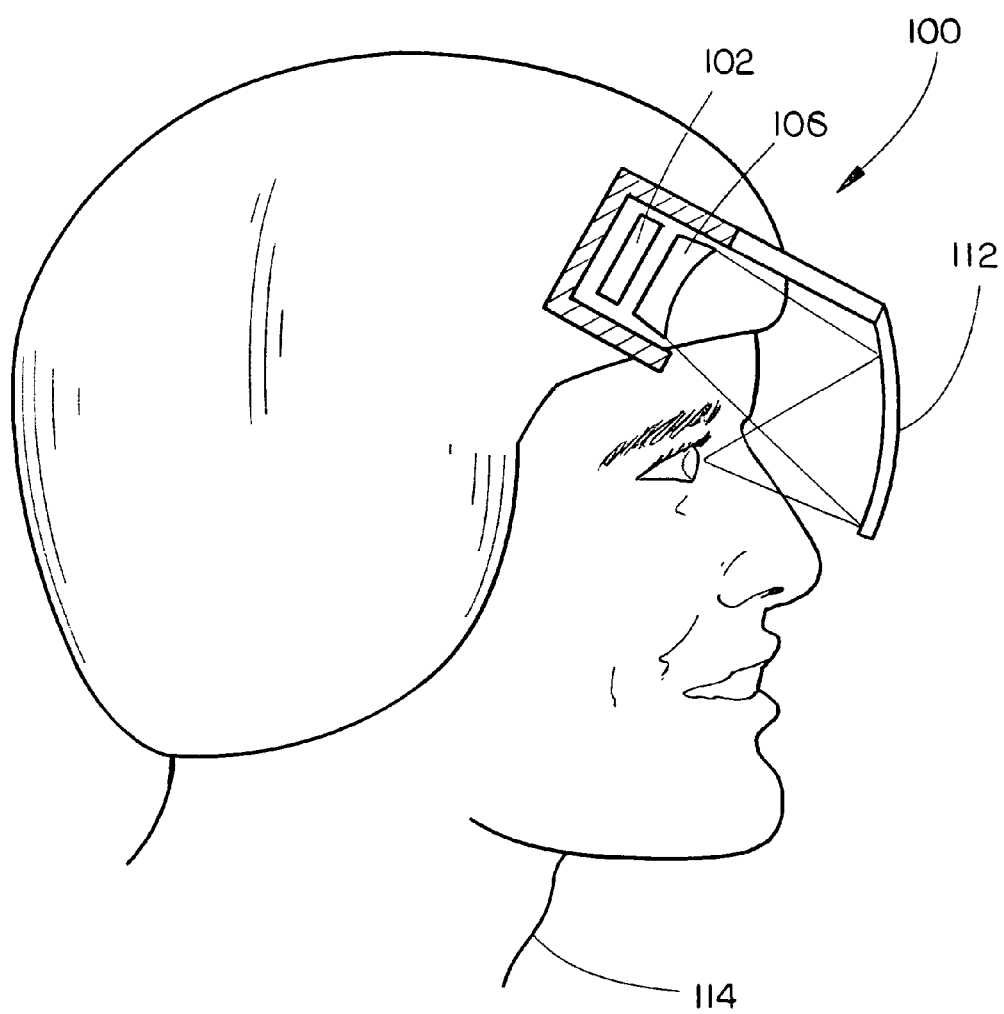
FIG. 6 is a side elevation view illustrating a head up display in accordance with an exemplary embodiment of the present invention, wherein a fiber bundle is utilized for projecting a display image onto a combiner for a head mounted display.

In other embodiments, the head up display 100 may be helmet-mounted, head-mounted, or otherwise wearable by a viewer, as illustrated in FIG. 6. In these embodiments, the visual field of a viewer moves with the viewer's head, and may be defined relative to the viewer. In FIG. 6, image source 102, fiber bundle 106, and combiner 112 are shown supported by a mount wearable by a viewer. In one embodiment, this mount comprises a helmet wearable by a viewer. In embodiments wherein the head up display 100 may be helmet-mounted, head-mounted, or otherwise wearable by a viewer, a computer determines an image to be presented depending on the orientation of the viewer and utilizes this data to generate symbology for the head up display 100. The symbology is collimated into the display image 104 that is projected by the image source 102 onto the fiber bundle 106 and then onto the combiner 112. For example, the head up display 100 may be utilized for overlaying tactical information onto the visual field of an infantryman, such as the output of a laser rangefinder, or the relative location of the soldier's squadmates. Additionally, the head up display 100 may be utilized for providing surgeons with an enhanced view, showing the results of x-rays or scans overlayed over their normal view of the patient, and thus allowing them to "see" structures normally invisible.

Additionally, the head up display 100 may be helmet-mounted, head-mounted, or otherwise wearable by a viewer, while the viewer travels in a moving vehicle. In these embodiments, the visual field of a viewer moves with the viewer's head, and may also be defined relative to the vehicle. In this instance, a computer determines an image to be presented depending on the orientation of the viewer, as well as the orientation of the vehicle, and utilizes this data to generate symbology for the head up display 100. The symbology is collimated into the display image 104 that is projected by the image source 102 onto the fiber bundle 106 and then onto the combiner 112.

It should be noted that while specific applications for the head up display 100 have been described with some specificity, these applications are exemplary and explanatory only, and are not restrictive of the invention. Thus, the head up display 100 may be utilized in other applications which still fall within the scope and extent of the present invention.

It is believed that the head up display 100 of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A head up display comprising:
   an image source configured to project a display image including one or more picture elements;
   a plurality of optical fibers having an input surface and an output surface and including a first optical fiber that changes position relative to a second fiber and a third fiber between the input surface and the output surface, wherein a change in a relative position of a first optical fiber and a second optical fiber between the input surface and the output surface is non-proportional with respect to a change in relative position of the first optical fiber and a third optical fiber between the input surface and the output; and
   a combiner positioned to receive the display image from the output surface.

2. The head up display as claimed in claim 1, wherein the plurality of optical fibers bends the display image from the image source to the combiner.

3. The head up display as claimed in claim 1, further comprising a microlens array, wherein each microlens of the microlens array is configured to focus one or more picture elements projected by the image source onto a corresponding optical fiber.

4. The head up display as claimed in claim 1, wherein the display image comprises a picture element transmitted by the image source, and the head up display further comprises a compensation film disposed between the image source and the plurality of optical fibers for widening the viewing angle of the picture element by a corresponding optical fiber of the plurality of optical fibers.

5. The head up display as claimed in claim 1, wherein the image source comprises at least one of a Liquid Crystal Display (LCD), an Organic Light Emitting Diode (OLED), and a Light Emitting Diode (LED).

6. A method for superimposing a display image in a visual field, comprising:
   receiving the one or more picture elements with a plurality of optic fibers having an input surface and an output surface;
   transmitting one or more picture elements from the input surface to the output surface, wherein a first picture element changes position relative to a second picture element and a third picture element between the input surface and the output surface, wherein a change in a relative position of a first picture element and a second picture element between the input surface and the output surface is non-proportional with respect to a change in relative position of the first picture element and a third picture element between the input surface and the output surface; and
   projecting a display image from the output surface of the plurality of optical fibers to a combiner positioned to receive the display image.

7. The method as claimed in claim 6, wherein the display image includes a picture element transmitted by the image source, the method further comprising the step of widening the viewing angle of the picture element by a corresponding optical fiber of the plurality of optical fibers.

8. The method as claimed in claim 6, wherein the image source comprises at least one of a Liquid Crystal Display (LCD), an Organic Light Emitting Diode (OLED), and a Light Emitting Diode (LED).

9. A system for superimposing a display image in a visual field, comprising:
   means for projecting a display image including one or more picture elements;

a plurality of optical fibers having an input surface and an output surface and including a first optical fiber that changes position relative to at least one of a second fiber and a third fiber between the input surface and the output surface, wherein a change in a relative position of a first optical fiber and a second optical fiber between the input surface and the output surface is non-proportional with respect to a change in relative position of the first optical fiber and a third optical fiber between the input surface and the output surface;

means for receiving the display image from the output surface.

10. The system as claimed in claim 9, wherein a change in a relative position of a first optical fiber relative to the second optical fiber and the third optical fiber of the plurality of optical fibers is configured to pre-transform the display image to reduce at least one of keystone aberration, curvature aberration, and astigmatism.

11. The system as claimed in claim 9, wherein the display image comprises a picture element transmitted by the projection means, and the system further comprises means for widening the viewing angle of the picture element by a corresponding optical fiber of the plurality of optical fibers.

12. The system as claimed in claim 9, wherein the projection means includes at least one of a Liquid Crystal Display (LCD), an Organic Light Emitting Diode (OLED), and a Light Emitting Diode (LED).

13. A head up display for superimposing a display image in a visual field, comprising:

an image source configured to project a display image including one or more picture elements;

a plurality of optical fibers having an input surface and an output surface and including a first optical fiber that changes position relative to at least one of a second fiber and a third fiber between the input surface and the output surface, wherein a change in a relative position of a first optical fiber and a second optical fiber between the input surface and the output surface is non-proportional with respect to a change in relative position of the first optical fiber and a third optical fiber between the input surface and the output surface;

a combiner positioned to receive the display image directly from the output; and a user-wearable mount for supporting the plurality of optical fibers, the image source, and the combiner.

14. The head up display as claimed in claim 1, wherein the display image is associated with an orientation of visual field of a viewer.

15. The head up display as claimed in claim 1, wherein the input surface has a first perimeter geometry and the output has a second perimeter geometry different from the first perimeter geometry.

* * * * *